US011138402B2

(12) United States Patent
Ota

(10) Patent No.: US 11,138,402 B2
(45) Date of Patent: Oct. 5, 2021

(54) ELECTRONIC APPARATUS AND CONTROL METHOD OF THE SAME

(71) Applicant: CANON KABUSHIKI KAISHA, Tokyo (JP)

(72) Inventor: Tomohiro Ota, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/943,664

(22) Filed: Jul. 30, 2020

(65) Prior Publication Data
US 2021/0042485 A1 Feb. 11, 2021

(30) Foreign Application Priority Data
Aug. 9, 2019 (JP) .............................. JP2019-147447

(51) Int. Cl.
*G06K 7/14* (2006.01)
(52) U.S. Cl.
CPC ......... *G06K 7/1417* (2013.01); *G06K 7/1443* (2013.01); *G06K 7/1447* (2013.01)
(58) Field of Classification Search
CPC ... G06K 7/1417; G06K 7/1447; G06K 7/1443
See application file for complete search history.

(56) References Cited

U.S. PATENT DOCUMENTS

2010/0314448 A1* 12/2010 Thuries .............. G06K 7/10811
235/462.24
2019/0171855 A1* 6/2019 Suman .................... G02B 26/12

FOREIGN PATENT DOCUMENTS

JP H10-134133 A 5/1998

* cited by examiner

*Primary Examiner* — Matthew Mikels
(74) *Attorney, Agent, or Firm* — Canon U.S.A., Inc. IP Division

(57) ABSTRACT

An electronic apparatus includes a first imaging unit, a second imaging unit with a focal length different from a focal length of the first imaging unit, and a reading unit configured to read information from an optical code image included in a captured image, and a control unit configured to perform control so as to, in a case where information based on the optical code image has been read by the reading unit from an image captured by the first imaging unit, execute processing corresponding to the read information, and in a case where information based on the optical code image has not been read by the reading unit from an image captured by the first imaging unit, to cause the reading unit to read information based on the optical code image, from an image captured by the second imaging unit, and execute processing corresponding to the read information.

17 Claims, 9 Drawing Sheets

FIG.3A
FIG.3B
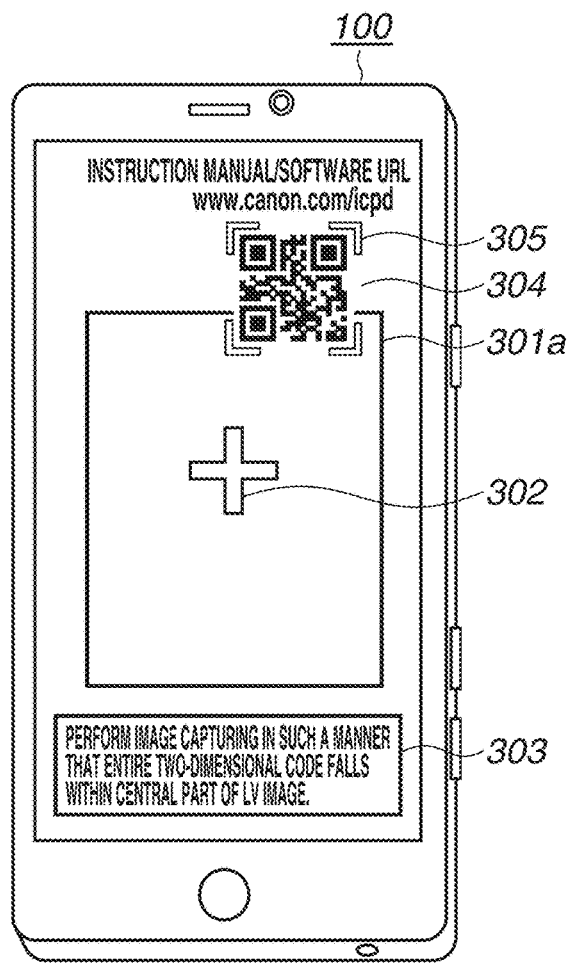
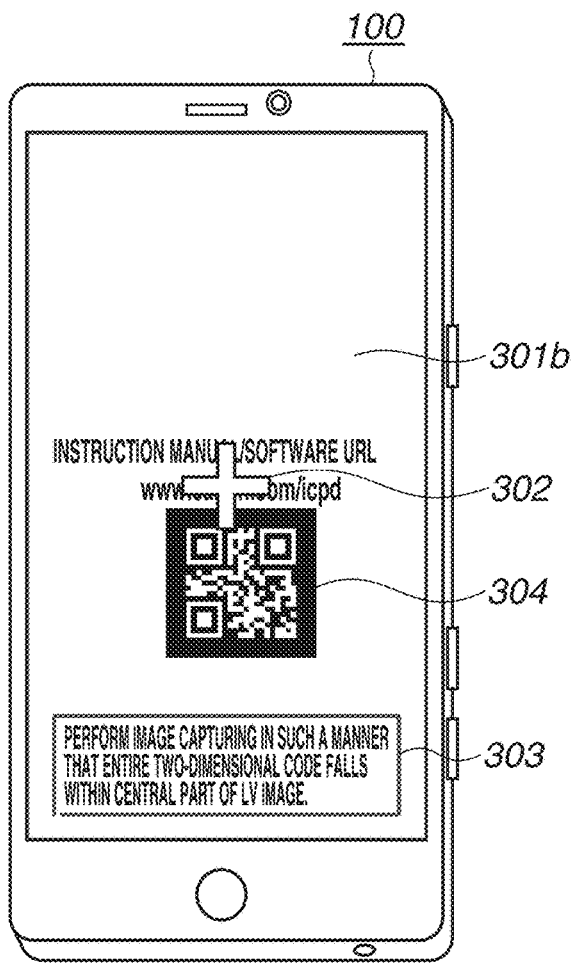

ELECTRONIC APPARATUS AND CONTROL METHOD OF THE SAME

BACKGROUND

Field of the Disclosure

The present disclosure relates to an electronic apparatus that can recognize optical code information, such as a two-dimensional code, by a plurality of imaging units, and a control method of an electronic apparatus.

Description of the Related Art

There has been known a technique used for advertisements, instruction manuals, and production management in factories. In this technique, a user can access a web page or detailed information by reading a printed or displayed two-dimensional code (i.e., optical code information). In recent years, an electronic payment that uses a two-dimensional code has become widely known as one of payment methods that use smartphones. Japanese Patent Application Laid-Open No. H10-134133 discusses a technique of changing an optical zoom magnification by driving a lens in accordance with a size of a barcode (one-dimensional code) included in an image that is captured by a reading device of an electronic apparatus, when reading the barcode.

However, in Japanese Patent Application Laid-Open No. H10-134133, a user has to adjust a distance between the barcode and the reading device of the electronic apparatus until the distance at which an image of the barcode can be captured in an appropriate size by performing optical zoom by driving the lens. If a mechanism that can perform optical lens driving is mounted on an electronic apparatus, the electronic apparatus needs to have a certain degree of size. It is therefore difficult to mount the mechanism on a compact electronic apparatus. For this reason, when a barcode is read by a conventional reading device of an electronic apparatus, if the reading device of the electronic apparatus is located too close to or too far away from the barcode, the user has been sometimes required to bring the electronic apparatus away from or close to the barcode until the reading device of the electronic apparatus comes to a position at which the reading device can read the barcode.

SUMMARY

Some embodiments of the present disclosure are directed to reducing a time of operation performed by a user for bringing an electronic apparatus away from or close to an optical code image when the electronic apparatus reads the optical code image.

According to an aspect of some embodiments, an electronic apparatus includes a first imaging unit, a second imaging unit with a focal length different from a focal length of the first imaging unit, and at least one memory and at least one processor which function as a reading unit configured to read information from an optical code image included in a captured image, and a control unit configured to perform control so as to, in a case where information based on the optical code image has been read by the reading unit from an image captured by the first imaging unit, execute processing corresponding to the read information, and in a case where information based on the optical code image has not been read by the reading unit from an image captured by the first imaging unit, to cause the reading unit to read information based on the optical code image, from an image captured by the second imaging unit, and execute processing corresponding to the read information.

Further features of various embodiments will become apparent from the following description of exemplary embodiments with reference to the attached drawings.

BRIEF DESCRIPTION OF THE DRAWINGS

FIGS. 3A, 3B, 3C, and 3D each illustrate a display example displayed on a display of the smartphone according to an exemplary embodiment.

DESCRIPTION OF THE EMBODIMENTS

Exemplary embodiments will be described in detail below with reference to the accompanying drawings.

It is to be noted that the following exemplary embodiments are each merely examples and can be appropriately modified or changed depending on individual constructions and various conditions of apparatuses to which the embodiments are applied. Thus, some embodiments are not limited to the following exemplary embodiments.

Hereinafter, exemplary embodiments will be described with reference to the drawings.

Figure 1A:
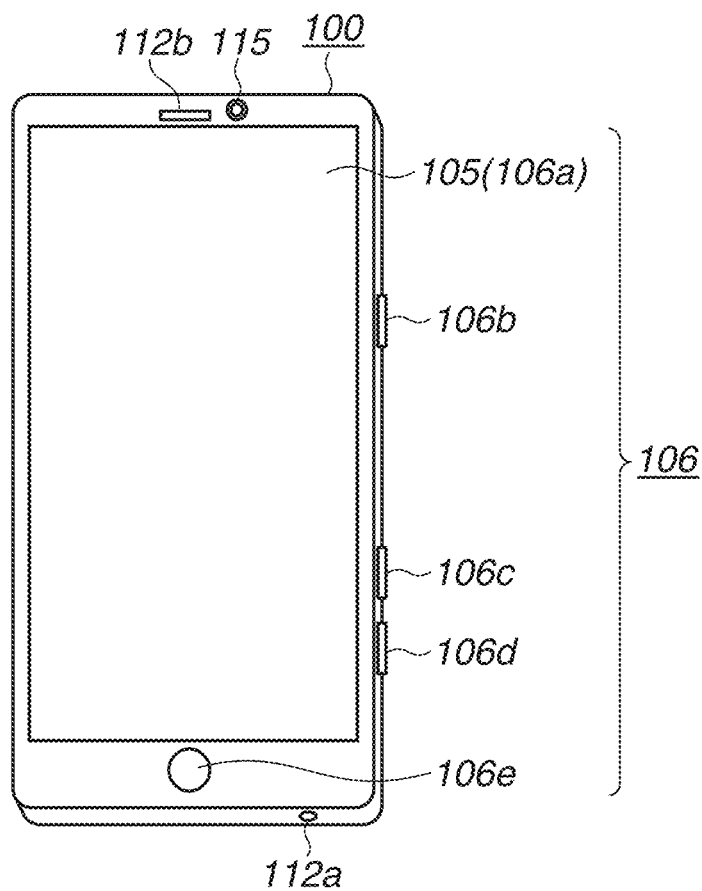
FIGS. 1A and 1B are external views illustrating a smartphone according to an exemplary embodiment.
Figure 1B:
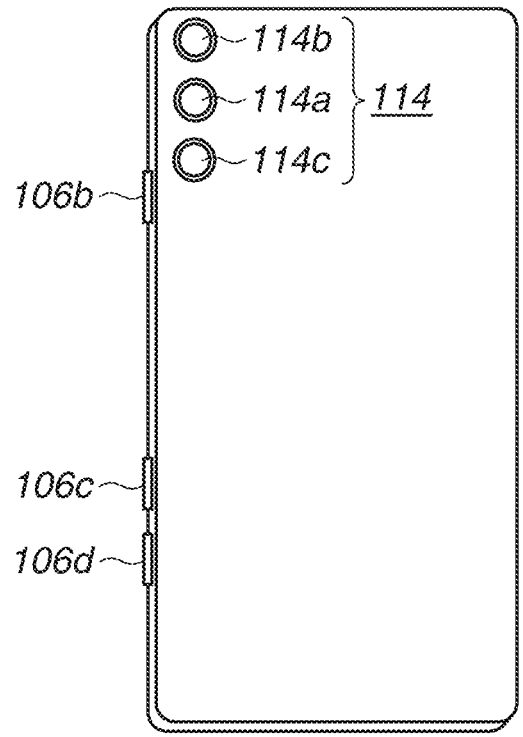

FIGS. 1A and 1B are external views illustrating a smartphone 100 serving as an example of a device (electronic apparatus) to which the present embodiment can be applied. FIG. 1A is a front view of the smartphone 100 and FIG. 1B is a rear view of the smartphone 100. In FIGS. 1A and 1B, a display 105 is a display unit that is provided on the front side of the smartphone 100, and displays images and various types of information. A touch panel 106a is a touch operation member and can detect a touch operation performed on a display surface (operation surface) of the display 105. The smartphone 100 can display, on the display 105, a live view image (LV image) captured by a rear camera 114 or a front camera 115. The rear camera 114 includes a telecamera 114a, a standard camera 114b, and a super-wide angle camera 114c, which will be described below. A power button 106b is an operation member included in an operation unit 106 and can switch light-on/off of the display 105. If the power button 106b is continuously pressed (long press) for a certain period of time, such as three seconds, power ON/OFF of the smartphone 100 can be switched. A volume plus button 106c and a volume minus button 106d are volume buttons for controlling the volume of sound and voice output from an audio output unit 112. If the volume plus button 106c is pressed, volume is increased, and if the volume minus button 106d is pressed, volume is decreased. In an image capturing standby state in a camera use state, the volume plus button 106c or the volume minus button 106d also functions as a shutter button that issues an image capturing instruction upon being pressed. The user can arbitrarily set a specific function to be executed when the power button 106b and the volume minus button 106d are simultaneously pressed, or when the volume minus button 106d is quickly pressed several times. A home button 106e is an operation button for displaying, on the display 105, a home screen, i.e., a start screen of the smartphone 100. When various applications are started up and used in the smartphone 100, by pressing the home button 106e, the operating various applications can be temporarily closed and the home screen can be displayed. While a physically-pressable button is used as the home button 106e in the present exemplary embodiment, a touchable button with a similar function that is displayed on the display 105 may be used as the home button 106e instead of a physical button. An audio output terminal 112a is an earphone jack and is a terminal that outputs audio signal to earphones or an external speaker. A speaker 112b is a speaker that is built in a main body and outputs sound and voice. When a terminal, such as an earphone cord, for outputting sound and voice from the smartphone 100 is not attached to the audio output terminal 112a, the sound and voice is output from the speaker 112b.

Figure 2:
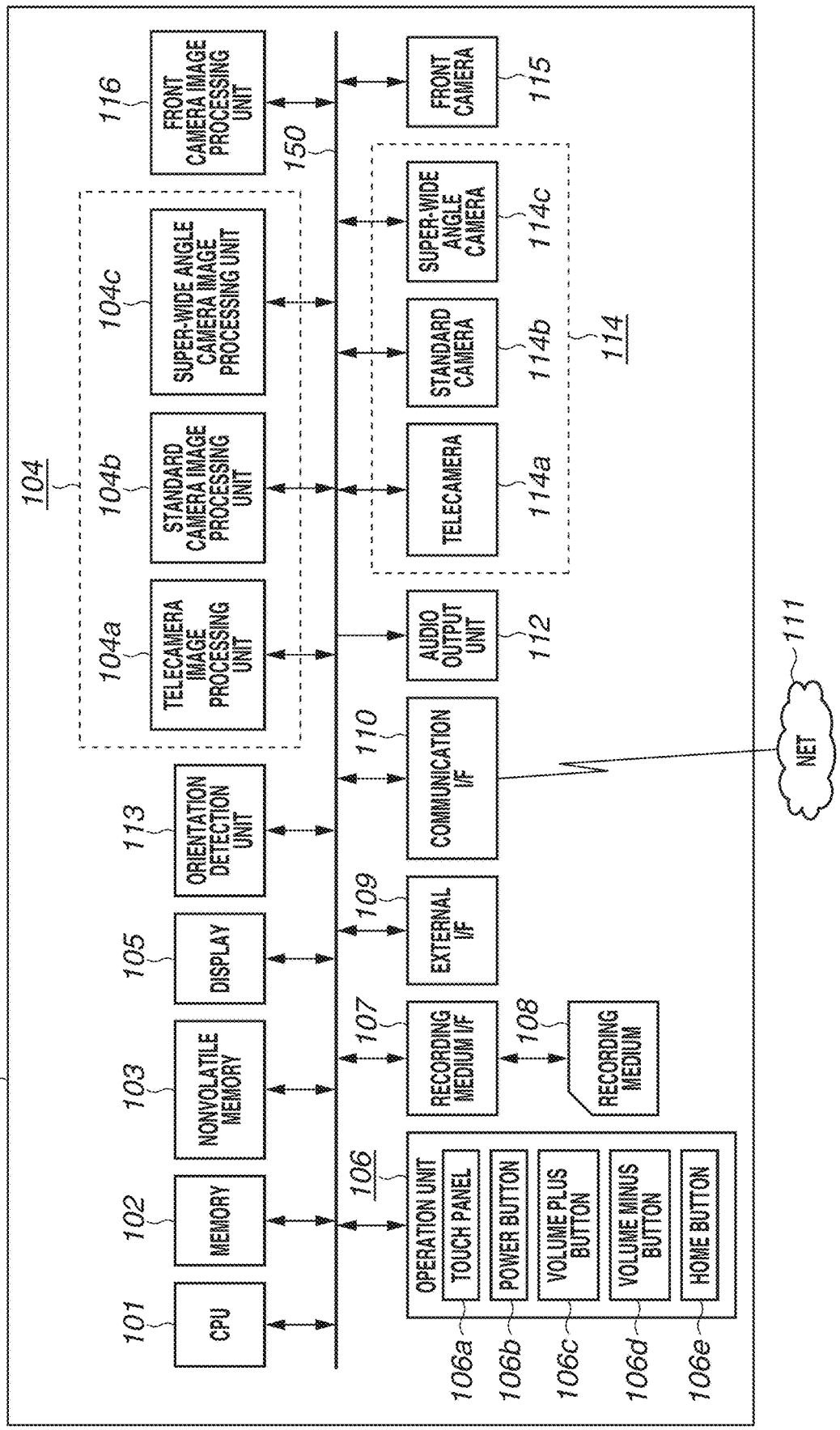
FIG. 2 is a block diagram illustrating a configuration of the smartphone according to an exemplary embodiment.

FIG. 2 is a block diagram illustrating a configuration example of the smartphone 100 according to the present exemplary embodiment. A central processing unit (CPU) 101, a memory 102, a nonvolatile memory 103, a rear camera image processing unit 104, the display 105, the operation unit 106, a recording medium interface (I/F) 107, an external I/F 109, and a communication I/F 110 are connected to an internal bus 150. The audio output unit 112, an orientation detection unit 113, the rear camera 114, the front camera 115, and a front camera image processing unit 116 are also connected to the internal bus 150. The components connected to the internal bus 150 can exchange data with each other via the internal bus 150.

The CPU 101 is a control unit that controls the entire smartphone 100, and includes at least a processor or a circuit. The memory 102 is, for example, a random access memory (RAM) (volatile memory that uses a semiconductor device). In accordance with a program stored in the nonvolatile memory 103, for example, the CPU 101 controls each component of the smartphone 100 using the memory 102 as a work memory. The nonvolatile memory 103 stores image data, audio data, other types of data, and various programs for operating the CPU 101. The nonvolatile memory 103 is, for example, a flash memory or a read-only memory (ROM).

Based on the control of the CPU 101, the rear camera image processing unit 104 performs various types of image processing and subject recognition processing on an image captured by the rear camera 114. The rear camera image processing unit 104 includes a telecamera image processing unit 104a, a standard camera image processing unit 104b, and a super-wide angle camera image processing unit 104c respectively corresponding to the telecamera 114a, the standard camera 114b, and the super-wide angle camera 114c. The respective image processing units perform processing on images captured by the respective cameras. In the present exemplary embodiment, the three rear cameras respectively include the image processing units, but not all the three rear cameras need to be individually provided with the respective image processing units. For example, any two cameras may share one image processing unit, or three cameras may share one image processing unit. In a similar manner, the front camera image processing unit 116 performs processing on an image captured by the front camera 115. Each image processing unit can also perform various types of image processing on an image stored in the nonvolatile memory 103 or a recording medium 108, a video signal acquired via the external I/F 109, and an image acquired via the communication I/F 110. Image processing to be performed by each image processing unit includes analog-to-digital (A/D) conversion processing, digital-to-analog (D/A) conversion processing, encoding processing, compression processing, decoding processing, enlargement/reduction processing (resizing), noise reduction processing, and color conversion processing of image data. Each image processing unit may include a dedicated circuit block for performing specific image processing. The rear camera image processing unit 104 can also perform decoding processing, which is a series of processes of detecting a feature of a two-dimensional code to be described below, determining the existence of the two-dimensional code, and reading information held by the two-dimensional code. The decoding processing will be described below in the description of a quick response (QR) code. The rear camera image processing units 104 may be integrated into one processing block, and independently perform image processing on images captured by the cameras, by parallel processing or time division processing. Depending on the type of image processing, the CPU 101 can perform image processing in accordance with a program without using each image processing unit.

Based on the control of the CPU 101, the display 105 displays an image and a graphical user interface (GUI) screen constituting a GUI. In accordance with a program, the CPU 101 generates a display control signal, generates a video signal for displaying a video image on the display 105, and controls each component of the smartphone 100 to output the video signal to the display 105. Based on the output video signal, the display 105 displays a video image. The smartphone 100 may include only an interface for outputting a video signal for displaying a video image on the display 105, and the display 105 may be an external monitor (e.g., television).

The operation unit 106 is an input device for receiving a user operation, including a character information input device, such as a keyboard, a pointing device, such as a mouse or a touch panel, a button, a dial, a joystick, a touch sensor, and a touchpad. The touch panel is an input device planarly formed so as to be overlaid on the display 105, and outputs coordinate information corresponding to a touched position. The operation unit 106 includes the touch panel 106a, the power button 106b, the volume plus button 106c, the volume minus button 106d, and the home button 106e, described above.

The recording medium 108, such as a memory card, a compact disc (CD), or a digital versatile disk (DVD), can be attached to the recording medium I/F 107. Based on the control of the CPU 101, the recording medium I/F 107 reads data from the attached recording medium 108 and writes data into the attached recording medium 108. The recording medium 108 may be a built-in storage incorporated in the smartphone 100. The external I/F 109 is an interface for connecting with an external device wirelessly or via a wired cable, and inputting and outputting a video signal and an audio signal. The communication I/F 110 is an interface for communicating with an external device or an internet 111, and transmitting and receiving various types of data, such as a file and a command.

The audio output unit 112 outputs voice and sound in a moving image or music data, operation sound, ringtone, and various types of notification sound. The audio output unit 112 includes the speaker 112b and the audio output terminal 112a for connecting earphones, but the audio output unit 112 may output audio signal by wireless communication.

The orientation detection unit 113 detects the orientation of the smartphone 100 with respect to a gravitational force direction, and the inclination of the orientation with respect to the axes of yaw, roll, and pitch. Based on the orientation detected by the orientation detection unit 113, it can be determined whether the smartphone 100 is horizontally held, whether the smartphone 100 is vertically held, whether the smartphone 100 faces up, whether the smartphone 100 faces down, or whether the smartphone 100 is at an oblique orientation. As the orientation detection unit 113, at least one of an acceleration sensor, a gyro sensor, a geomagnetic sensor, a direction sensor, or an altitude sensor can be used, or a plurality of sensors can also be used in combination.

The rear camera 114 is a camera disposed on the opposite side of the display 105 on the casing of the smartphone 100. A focal length of the telecamera 114a is longer than a focal length of the standard camera 114b, and the telecamera 114a can capture an image of telephoto side more than the standard camera 114b can capture. A focal length of the super-wide angle camera 114c is shorter than a focal length of the standard camera 114b, and the super-wide angle camera 114c can capture a wider-angle image than an image captured by the standard camera 114b. In other words, focal lengths become shorter in the order of the telecamera 114a, the standard camera 114b, and the super-wide angle camera 114c, and field-of-views accordingly become wider. In the present exemplary embodiment, the telecamera 114a is appearing to include a lens having a mechanism of being optically zoomed to a predetermined magnification, but may include a lens having a mechanism with a magnification changeable by the user. The front camera 115 is a camera disposed on the same surface as the display 105 on the casing of the smartphone 100. The three rear cameras 114, including the telecamera 114a, the standard camera 114b, and the super-wide angle camera 114c, can simultaneously perform an image capturing operation. The three rear cameras 114 can simultaneously perform an image capturing operation as described above, but not all the three rear cameras 114 necessarily operate at the same time, and any two rear cameras of the three rear cameras 114 may operate, or one rear camera can independently operate. Live view videos captured by the rear camera 114 and the front camera 115 can be both displayed on the display 105. By the operation performed on the touch panel 106a, a video image captured by which camera is to be displayed on the display 105 can be selected. More specifically, if the telecamera 114a is selected, an image larger than that of an image captured by the standard camera 114b can be displayed on the display 105. If the standard camera 114b is selected, an image with an angle wider than that of an image captured by the telecamera 114a, and enlarged more than that of an image captured by the super-wide angle camera 114c, can be displayed. If the super-wide angle camera 114c is selected, an image captured at an angle wider than both images respectively captured by the telecamera 114a and the standard camera 114b can be displayed. Alternatively, depending on which of the rear camera 114 and the front camera 115 is used, whether to capture an image of what a user sees or whether to capture an image of the user herself/himself can be selected.

The operation unit 106 includes the touch panel 106a. The CPU 101 can detect the following operations performed on the touch panel 106a or the states thereof.

An operation of a finger or a stylus that has not been in touch with the touch panel 106a newly touching the touch panel 106a, i.e., the start of a touch on the touch panel 106a (hereinafter, referred to as "Touch-Down").

A state where a finger or a stylus is in touch with the touch panel 106a (hereinafter, referred to as "Touch-On").

An operation of a finger or a stylus moving over the touch panel 106a while being in touch with the touch panel 106a (hereinafter, referred to as "Touch-Move").

An operation of a finger or a stylus that has been in touch with the touch panel 106a detaching from the touch panel 106a, i.e., the end of a touch on the touch panel 106a (hereinafter, referred to as "Touch-Up").

A state where nothing touches the touch panel 106a (hereinafter, referred to as "Touch-Off").

If the Touch-Down is detected, the Touch-On is simultaneously detected. After the Touch-Down, normally, the Touch-On continues to be detected until the Touch-Up is detected. Also when the Touch-Move is detected, the Touch-On is simultaneously detected. Even if the Touch-On is detected, the Touch-Move is not detected unless a touch position moves. If the Touch-Up of all the fingers or styluses that have been in touch is detected, the Touch-Off is detected.

These operations and states, and a position coordinate on the touch panel 106a at which a finger or a stylus is in touch, are notified to the CPU 101 via an internal bus. Based on the notified information, the CPU 101 determines what type of operation (touch operation) has been performed on the touch panel 106a. As for the Touch-Move, a moving direction of a finger or a stylus moving on the touch panel 106a can also be determined for each perpendicular component and horizontal component on the touch panel 106a based on a change in position coordinate. If it is detected that the Touch-Move has been performed for a predetermined distance or more, it is determined that a slide operation has been performed. An operation of swiftly moving a finger by a certain amount of distance with the finger being in touch on the touch panel 106a, and then detaching the finger in this state, will be referred to as a flick. In other words, the flick is an operation of swiftly moving the finger over the touch panel 106a like a flip. If it is detected that the Touch-Move has been performed at a predetermined speed or more for a predetermined distance or more, and the Touch-Up is detected in this state, it can be determined that a flick has been performed (it can be determined that a flick has been performed subsequent to the slide operation). Furthermore, a touch operation of simultaneously touching a plurality of locations (e.g., two points), and bringing the touch positions closer to each other will be referred to as "pinch-in", and a touch operation of bringing the touch positions away from each other will be referred to as "pinch-out". The pinch-out and the pinch-in will be collectively referred to as a pinch operation (or simply "pinch"). As the touch panel 106a, a touch panel of any of the following various types may be used: a resistive type touch panel, a capacitive type touch panel, a surface acoustic wave type touch panel, an infrared type touch panel, an electromagnetic induction type touch panel, an image recognition type touch panel, and an optical sensor type touch panel. Depending on the types, some touch panels detect a touch upon detecting contact with the touch panels while the other touch panels detect a touch upon detecting the proximity of a finger or a stylus to the touch panels. A touch panel of any type of them may be used.

A two-dimensional code refers to a code in a display format holding information in a horizontal direction and a vertical direction in contrast to a one-dimensional code, such as a barcode, that holds information only in a horizontal direction. Major two-dimensional codes include a matrix two-dimensional code and a stacked two-dimensional code. A QR code® is a representative code of a matrix two-dimensional code, and PDF417 is a representative code of a stacked two-dimensional code. As compared with a one-dimensional code, a two-dimensional code can hold a larger amount of information. In particular, a QR code can store not only numbers but also multilingual data, such as alphabetical characters and Chinese characters. Because a QR code can be read by an image sensor, the QR code does not always require a dedicated reading device as other two-dimensional codes require, and can be easily read by a camera serving as an imaging unit included in a mobile phone or a smartphone.

Figure 6:
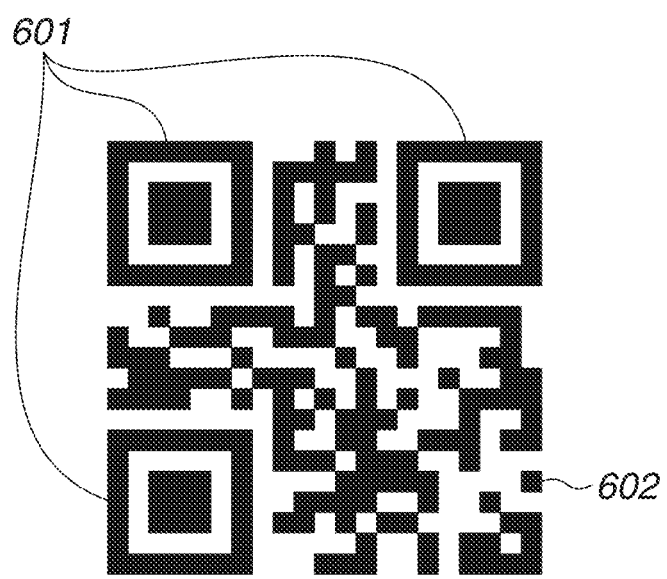
FIG. 6 illustrates a display example of a quick response (QR) code® serving as one of two-dimensional codes.

As described above, a QR code is a matrix type two-dimensional code, and is a pattern image formed by vertically and horizontally arraying cells 602 each being a small square, as illustrated in FIG. 6. Encoding processing is performed on various symbols, such as numbers, alphabetical characters, and Chinese characters, and a QR code is created by a combination of the cells 602 and an array of the cells 602. Patterns like symbols 601, each called a cutout symbol, are arranged at three corners of a square. Based on the cutout symbols, the square is recognized as a QR code. More specifically, the symbols 601 serving as cutout symbols are detected from a captured image, and a size of a QR code is detected based on the detected symbols 601. A cell distribution pattern formed by the cells 602 in the detected size of the QR code is detected, and the distribution pattern is interpreted. Information held by the QR code is thereby read. A series of processes of searching for the symbols 601 serving as cutout symbols, from an image, detecting a cell distribution pattern, and reading information will be referred to as decoding processing.

Based on the symbols 601 serving as cutout symbols, the CPU 101 not only recognizes a QR code and detects a size, but also detects inclination and deformation of the QR code. In the present exemplary embodiment to be described below, whether a QR code falls within an image capturing range is determined by recognizing the symbols 601. In this case, for correctly reading information held by a QR code, as described above, it is necessary to accurately read a distribution pattern formed by the cells 602 of the QR code. For example, when a QR code is to be read using a smartphone, if a distribution pattern formed by the cells 602 fails to be accurately recognized due to a too long distance between a camera of the smartphone and the QR code or a dark image capturing location, information cannot be read from the QR code. In this case, the decoding processing cannot be performed. Thus, for reading information held by a QR code, i.e., for executing the decoding processing, it is necessary to accurately read a distribution pattern formed by the cells 602. As for the number of cells in a QR code existing in the current era, there exist the number of vertical cells and the number of horizontal cells of 21×21 cells to 177×177 cells increasing every 4 cells. The QR code illustrated in FIG. 6 includes 21×21 cells. As the number of cells increases, a larger amount of information can be held.

In these days, various types of information can be easily obtained by using a QR code. For example, by printing or displaying a QR code on an advertisement or an instruction manual, the user who reads the QR code can easily access a desired web page. A redundancy code, for correcting an error occurred when a part of data fails to be read or a part of data is erroneously read, is added to a QR code. With this configuration, the QR code is more resistant to dirt and deformation as compared with other codes. The QR code is therefore widely used for the management of a production line in a production site, such as a factory. Furthermore, as an electronic payment that uses a credit card instead of cash, such as bills, has become frequently-used, a QR code payment for making payment by reading a QR code using a smartphone has started to be widely known as one of electronic payments. When such a QR code payment becomes widespread, it is demanded that the user is enabled to smoothly make payment without taking time in reading QR code.

In the present exemplary embodiment, control processing of controlling a camera in reading a two-dimensional code in the smartphone 100 will be described.

Figure 3C:
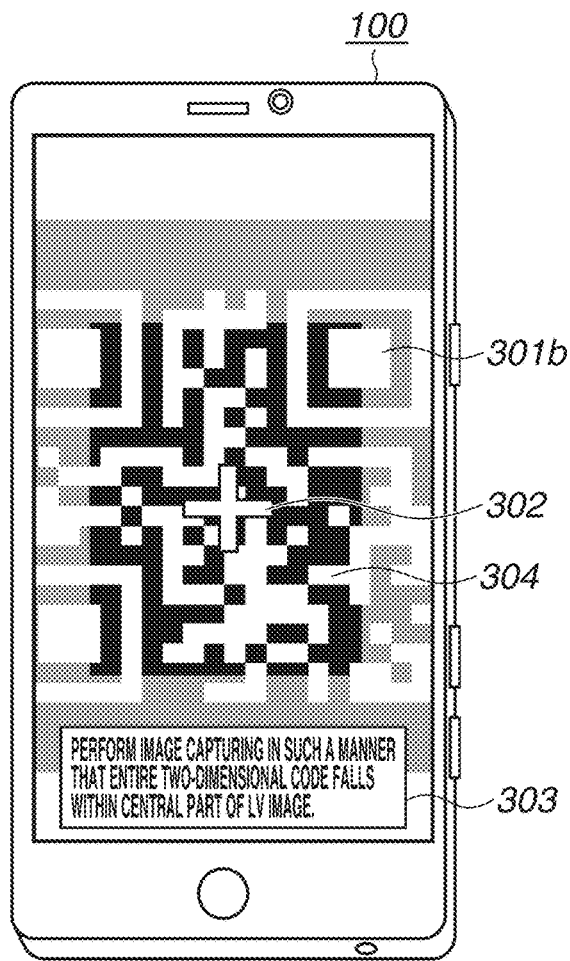
Figure 3D:
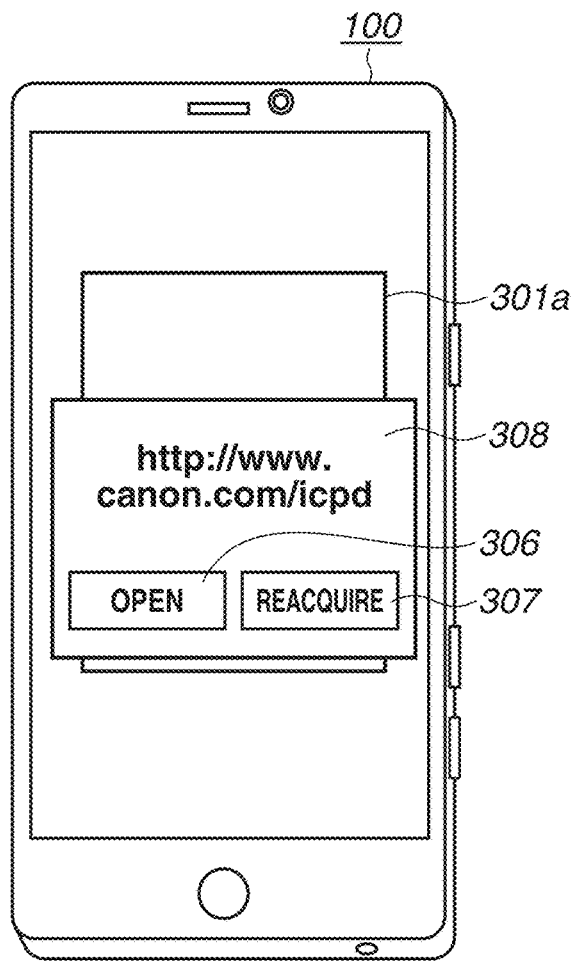
Figure 4A:
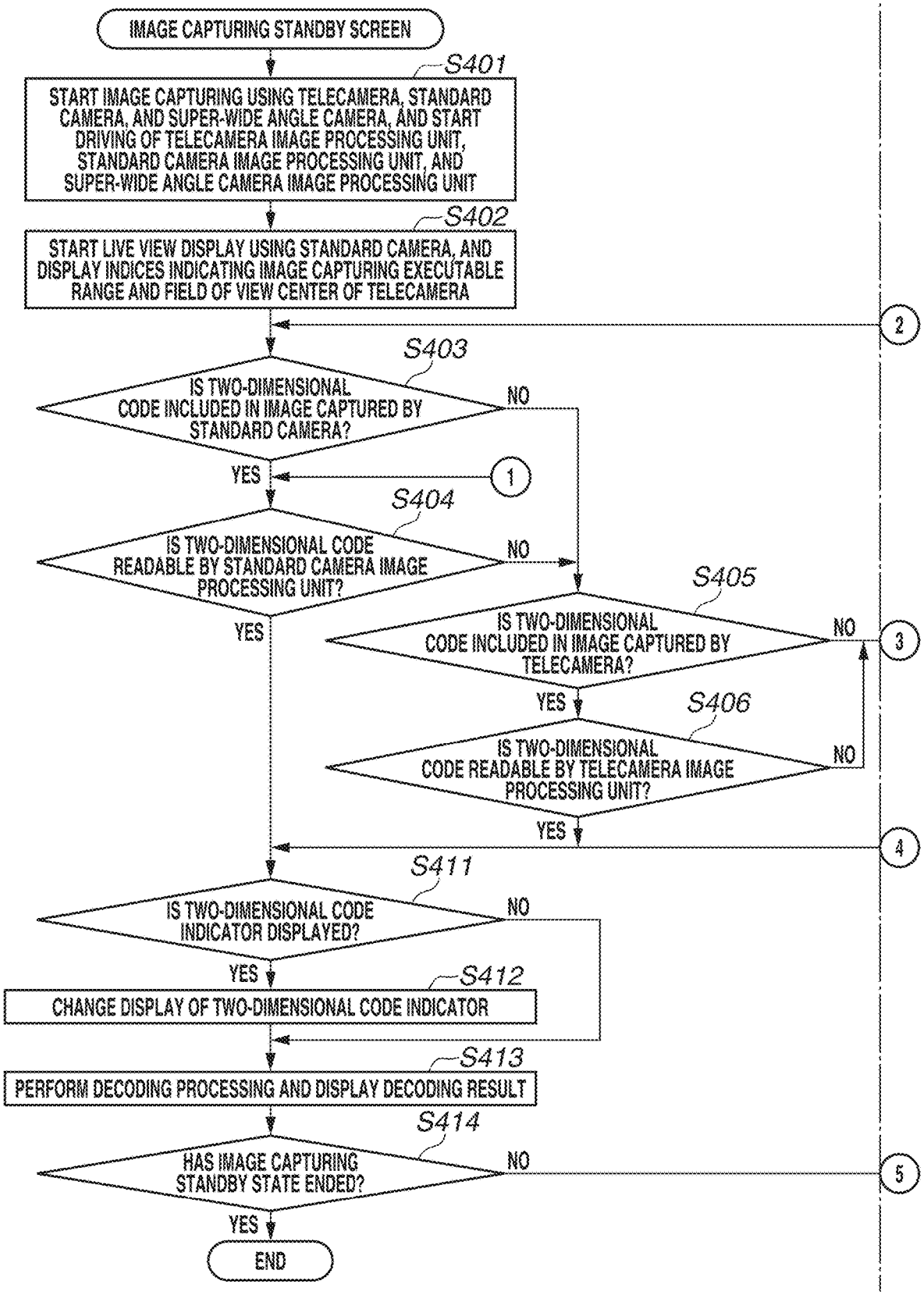
FIGS. 4A and 4B are a flowchart illustrating control processing of two-dimensional code reading according to a first exemplary embodiment.
Figure 4B:
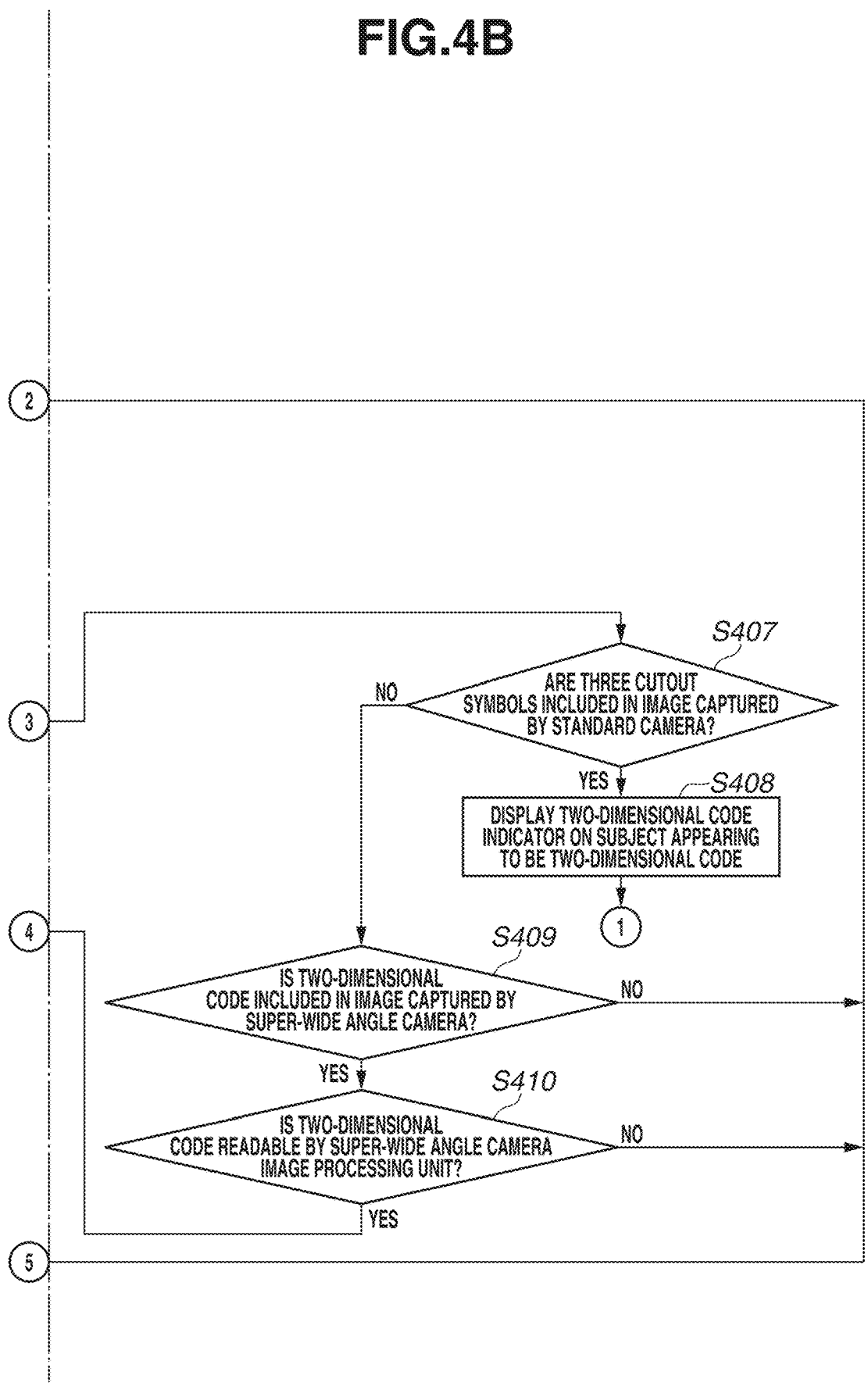

In a first exemplary embodiment, a description will be given of an example in which the three rear cameras 114, including the telecamera 114a, the standard camera 114b, and the super-wide angle camera 114c, are simultaneously driven, and a two-dimensional code, which is optical code information, is read by the most appropriate camera among the rear cameras 114. FIGS. 4A and 4B are a flowchart illustrating control processing of driving the rear cameras 114 and the rear camera image processing units 104, and reading a two-dimensional code, i.e., performing the decoding processing of a two-dimensional code. The control processing is implemented in the smartphone 100 by the CPU 101 executing a program stored in the nonvolatile memory 103. The flowchart illustrated in FIGS. 4A and 4B are started when a camera application is started up in the smartphone 100 and the smartphone 100 is in an image capturing standby state. An application to be started up is not limited to the above-described camera application. The flowchart may be started when a two-dimensional code reading function of an application for performing decoding processing of a two-dimensional code is started up and the smartphone 100 is in the image capturing standby state. FIGS. 3A, 3B, 3C, and 3D each illustrate a display example displayed on the display 105 when a two-dimensional code is read.

In S401, the CPU 101 starts image capturing using the three rear cameras, 114 including the telecamera 114a, the standard camera 114b, and the super-wide angle camera 114c, and starts the driving of the three rear camera image processing units 104a to 104c.

In S402, the CPU 101 displays, on the display 105, an LV image captured by the standard camera 114b among the three rear cameras 114 driven in S401. FIG. 3A illustrates a display example displayed at this time. In the first exemplary embodiment, irrespective of which rear camera 114 executes reading of a code 304 included in an LV image, an LV image captured by the standard camera 114b is displayed on the display 105. As an indicator indicating an image capturing executable range of the telecamera 114a, a frame 301a and a marker 302 are displayed in an overlaid manner on the LV image displayed on the display 105. The marker 302 is an item indicating a center position of an image that can be captured by the telecamera 114a, and a center position of an image that can be captured by the super-wide angle camera 114c. The frame displayed as an image capturing executable range of the telecamera 114a is only required to be visually recognizable as a range. The frame may be a solid-line frame like the frame 301a illustrated in FIG. 3A, or may be a dotted-line frame. Like a frame 301b illustrated in FIG. 3B, the frame may be displayed with a semi-transmissive mask applied on an outside region of the image capturing executable range. The marker 302 illustrated in FIG. 3A is only required to be a marker that can be visually recognized by the user as a center of an image that can be captured by the telecamera 114a. The marker 302 may be a cross-shaped marker like the marker 302, or may be a marker such as a point. The frame 301a and the marker 302 need not be displayed in an overlaid manner on an LV image. When the code 304 is read, displaying the frame 301a and the marker 302 in an overlaid manner on the LV image displayed on the display 105 helps the user to visually recognize a position at which the code 304 is to be framed for enabling the smartphone 100 to read the code 304. By displaying on the display 105 an LV image captured by the standard camera 114b, the user can view a wider range than a range obtained when the user views an LV image captured by the telecamera 114a, irrespective of which camera performs recognition. In this way, the user can easily perform framing when capturing an image of the code 304. By displaying the frame 301a, which is an image capturing executable range of the telecamera 114a, in an overlaid manner on the LV image of the standard camera 114b, if the code 304 falls within the frame 301a, the code 304 is less likely to fall outside a field-of-view when recognized by the telecamera 114a. In other words, if the code 304 falls within the indicator of the frame 301a, irrespective of which rear camera 114 performs recognition, the code 304 becomes more likely to be recognized. In addition, by displaying a message like a guide 303 illustrated in FIG. 3A, on the display 105 in addition to the frame and the marker, it becomes easier for the user to capture an image of the code 304 within the indicator of the frame 301a, and the code 304 becomes more likely to be recognized.

In S403, using the standard camera image processing unit 104b, the CPU 101 determines whether an optical code image, e.g., a subject appearing to be a two-dimensional code, is included in an image captured by the standard camera 114b. If the two-dimensional code is included in the captured image (YES in S403), the processing proceeds to S404. If the two-dimensional code is not included in the captured image (NO in S403), the processing proceeds to S405. As described above, if the CPU 101 can determine whether the symbol 601 is included, the CPU 101 can determine whether a subject included in a captured image is a two-dimensional code. For example, even if a two-dimensional code is located too far away from the standard camera 114b (i.e., too small to read information therefrom), the symbols 601 can be easily detected from a far position because the symbols 601 are larger than the cells 602. Even when not all the three symbols 601 are included in a captured image, if one or two symbols 601 are included in a captured image, the subject is more likely to be a two-dimensional code. In other words, in S403, the CPU 101 determines whether the symbol 601 is included in an image captured by the standard camera 114b.

In S404, the CPU 101 determines whether the two-dimensional code is readable by the standard camera image processing unit 104b from the image captured by the standard camera 114b. If the two-dimensional code is readable (YES in S404), the processing proceeds to S411. If the two-dimensional code is unreadable (NO in S404), the processing proceeds to S405. As described above, "the two-dimensional code is readable" means that a distribution pattern of the cells 602 forming the two-dimensional code is detectable. In other words, it means that the decoding processing of the two-dimensional code is executable. "The decoding processing of the two-dimensional code is executable" means that an image of the two-dimensional code has been captured as accurately as the distribution pattern of the cells 602 is detectable. Even when the symbol 601 has been detected and the two-dimensional code has been recognized in S403, if the standard camera 114b is located too far away from the two-dimensional code, the distribution pattern cannot be accurately detected. Alternatively, if the standard camera 114b is located too close to the two-dimensional code and not all the three symbols 601 are detectable, size recognition of the two-dimensional code in the decoding processing cannot be performed. Thus, the decoding processing cannot be performed also when the standard camera 114b is located too close to the two-dimensional code.

In S405, using the telecamera image processing unit 104a, the CPU 101 determines whether a subject appearing to be a two-dimensional code is included in an image captured by the telecamera 114a, e.g., determines whether the symbol 601 is included in the captured image. If the two-dimensional code is included in the captured image (YES in S405), the processing proceeds to S406. If the two-dimensional code is not included in the captured image (NO in S405), the processing proceeds to S407.

In S406, the CPU 101 determines whether the two-dimensional code is readable by the telecamera image processing unit 104a from the image captured by the telecamera 114a, e.g., determines whether a distribution pattern of the cells 602 of a subject appearing to be a two-dimensional code is detectable. If the distribution pattern is detectable (YES in S406), the processing proceeds to S411. If the distribution pattern is undetectable (NO in S406), the processing proceeds to S407.

In S407, the CPU 101 determines whether the three symbols 601 are included in the image captured by the standard camera 114b in S403. If the three symbols 601 are included in the captured image (YES in S407), the processing proceeds to S408. If the three symbols 601 are not included in the captured image (NO in S407), the processing proceeds to S409.

In S408, the CPU 101 displays a two-dimensional code indicator, such as a frame 305 illustrated in FIG. 3A, on the subject appearing to be a two-dimensional code determined in S403, and the processing returns to S404. Because it has been determined to be YES in S407, the three symbols 601 are included in the image captured by the standard camera 114b. Thus, an image of the entire two-dimensional code has been captured by the standard camera 114b. However, it is considered that the decoding processing cannot be performed because the two-dimensional code is too small to detect a distribution pattern of the cells 602 by the standard camera 114b (i.e., the distance between the standard camera 114b and the two-dimensional code is too long). From the determination to be NO in S405 and S406 in addition to the determination to be YES in S407, it may be considered that a subject appearing to be a two-dimensional code falls outside the frame 301a, which is an image capturing executable range of the telecamera 114a, as illustrated in FIG. 3A. Even if the CPU 101 tries to recognize the distribution pattern of the cells 602 in such a state using the telecamera 114a, an image of the entire code 304 cannot be captured because the code 304 falls outside the image capturing executable range of the telecamera 114a. Accordingly, even if the code 304 is large enough, information cannot be read. Accordingly, by accentuating the code 304 that is a subject appearing to be a two-dimensional code, using a two-dimensional code indicator like the frame 305, it becomes easier for the user to visually recognize the code 304. A message like the guide 303 is also displayed. By the code 304 and the guide 303, the user is prompted to frame the code 304 into the image capturing executable range of the telecamera 114a. If the user frames the code 304 into the image capturing executable range of the telecamera 114a, it becomes easier to recognize the code 304 by both the standard camera image processing unit 104b and the telecamera image processing unit 104a. Furthermore, if the marker 302 indicating the center of an LV image is displayed on the display 105, the user intuitively performs image capturing in such a manner as to match the two-dimensional code with the marker 302, and the code 304 becomes more likely to be recognized. The guide 303 may be displayed from when an LV image is started to be displayed on the display 105, or the display of the guide 303 may be started at the same timing as the display timing of the frame 305 in S408.

In S409, using the super-wide angle camera image processing unit 104c, the CPU 101 determines whether a subject appearing to be a two-dimensional code is included in an image captured by the super-wide angle camera 114c, e.g., determines whether the symbol 601 is included in the captured image. If the two-dimensional code is included in the captured image (YES in S409), the processing proceeds to S410. If the two-dimensional code is not included in the captured image (NO in S409), the processing returns to S403. Because it has been determined to be NO in S407, it can be seen that three symbols 601 are not included in the image captured by the standard camera 114b. For this reason, it is considered that an image of the code 304 is captured in a too large size and an image of only a part of the code 304 is captured as illustrated in FIG. 3C (i.e., distance between the standard camera 114b and the code 304 is too short). Thus, the CPU 101 tries to capture an image of a wider range using the super-wide angle camera 114c. Even in such a case, owing to the marker 302, the user is prompted to frame the code 304 into the central part of the image capturing range of the super-wide angle camera 114c as described above in S408, and the code 304 can be recognized easily from the image captured by the super-wide angle camera 114c.

In S410, the CPU 101 determines whether the two-dimensional code is readable by the super-wide angle camera image processing unit 104c from the image captured by the super-wide angle camera 114c, i.e., a distribution pattern of the cells 602 of a subject appearing to be a two-dimensional code is detectable. If the distribution pattern is detectable (YES in S410), the processing proceeds to S411. If the distribution pattern is undetectable (NO in S410), the processing returns to S403.

In S411, the CPU 101 determines whether the two-dimensional code indicator displayed in S408 is displayed. If the two-dimensional code indicator is displayed (YES in S411), the processing proceeds to S412. If the two-dimensional code indicator is not displayed (NO in S411), the processing proceeds to S413.

In S412, the CPU 101 changes a display mode of the frame 305, which is the two-dimensional code indicator, that has been displayed in S408. In S407, the code 304 is not clearly recognized as a two-dimensional code and is determined to be a subject appearing to be a two-dimensional code. In other words, the frame 305 displayed in S408 is merely a two-dimensional code indicator for notifying the user that the subject is a subject appearing to be a two-dimensional code, and is not a two-dimensional code indicator for indicating that a two-dimensional code has been read. Accordingly, if a two-dimensional code has been read in S404, S406, or S410, the color of the frame 305 may be changed, for example, from white to yellow, or a frame surrounding the entire two-dimensional code may be displayed instead of a frame having only four corners, for notifying the user that the two-dimensional code has been read. With such a change in display mode, the user can understand that the rear camera image processing unit 104 has been able to read the two-dimensional code.

In S413, because a distribution pattern of the cells 602 of the code 304 has been read in S404, S406, or S410, the CPU 101 performs the decoding processing. The CPU 101 displays, on the display 105, a result obtained by the decoding processing. More specifically, the CPU 101 displays, on the display 105, information held by the two-dimensional code. For example, if information held by the code 304 is a uniform resource locator (URL) indicating an access destination of a web page, a URL, which is access information, is displayed as in a dialog box 308 illustrated in FIG. 3D, and a confirmation screen for confirming whether to access the web page is displayed. If the user touches a guide 306, the smartphone 100 accesses the web page. If the user touches a guide 307, it is assumed that the user does not desire to access the web page or desires to reread a two-dimensional code, and the state returns to the image capturing standby state as illustrated in FIG. 3A. In the present exemplary embodiment, when the smartphone 100 accesses a web page, the dialog box 308 as illustrated in FIG. 3D is displayed, and the confirmation screen is displayed, but the confirmation screen may not need to be displayed. The smartphone 100 may access the URL, which is information held by the two-dimensional code, without displaying the confirmation screen, and may open the web page immediately after the two-dimensional code is read. The user may be allowed to arbitrarily set whether to display the confirmation screen or directly open the web page. If a two-dimensional code holds text information, the text information is displayed in a portion in the dialog box 308 in which the URL is displayed. In the present exemplary embodiment, the description has been given of a configuration of reading various types of information using an application that can read various two-dimensional codes. However, in some cases, reading is performed using an application that reads only a two-dimensional code holding specific information. In such a case, if a two-dimensional code holding information other than the specific information that can be read only by the above-described specific application is read, a warning may be displayed in the dialog box 308, or the image capturing standby state may be continued without displaying a warning.

In S414, the CPU 101 determines whether the image capturing standby state has ended. If the image capturing standby state has ended (YES in S414), this control flow ends. If the image capturing standby state has not ended (NO in S414), the processing returns to S403. The case where the image capturing standby state has ended includes a case where the user has ended the camera application, and a case where a screen transitions to a different screen other than an image capturing standby screen after the decoding processing has been performed in S413. In both cases, the user is assumed to have ended the reading of a two-dimensional code, and this control flow ends. If the image capturing standby screen continues to be displayed, it is assumed that a two-dimensional code is to be continuously read.

As described above with reference to FIGS. 3A, 3B, 3C, and 3D, and the control flow illustrated in FIGS. 4A and 4B, the three rear cameras 114, including the telecamera 114a, the standard camera 114b, and the super-wide angle camera 114c, and the rear camera image processing units 104, are simultaneously driven, and a two-dimensional code is read. By simultaneously driving the three rear cameras 114, it is possible to quickly and easily access information using a camera that has read a two-dimensional code, without the user performing a switching operation of the rear cameras 114. By displaying an LV image captured by the standard camera 114b, irrespective of which camera has read a two-dimensional code, the user can view a wider range than an image captured by the telecamera 114a, and easily frame a two-dimensional code. In the first exemplary embodiment, because the three rear cameras 114 are simultaneously driven, a switching operation of the cameras is not performed. Thus, if any of the rear cameras 114 has succeeded in reading a two-dimensional code, the decoding processing can be performed. If the rear camera 114 is located too close to the code 304 as illustrated in FIG. 3C, the recognition and the reading of a two-dimensional code are performed by the super-wide angle camera 114c. In such a case, if the user frames a two-dimensional code based on the frame 301a and the marker 302, any of the three rear cameras 114 can easily recognize the two-dimensional code. For this reason, an LV image captured by the standard camera 114b is displayed. In this way, using the three rear cameras 114, a two-dimensional code can be read with a wider range of focal length. Therefore, the user can reduce an operation of bringing a reading device of an electronic apparatus away from or close to the two-dimensional code.

Figure 5A:
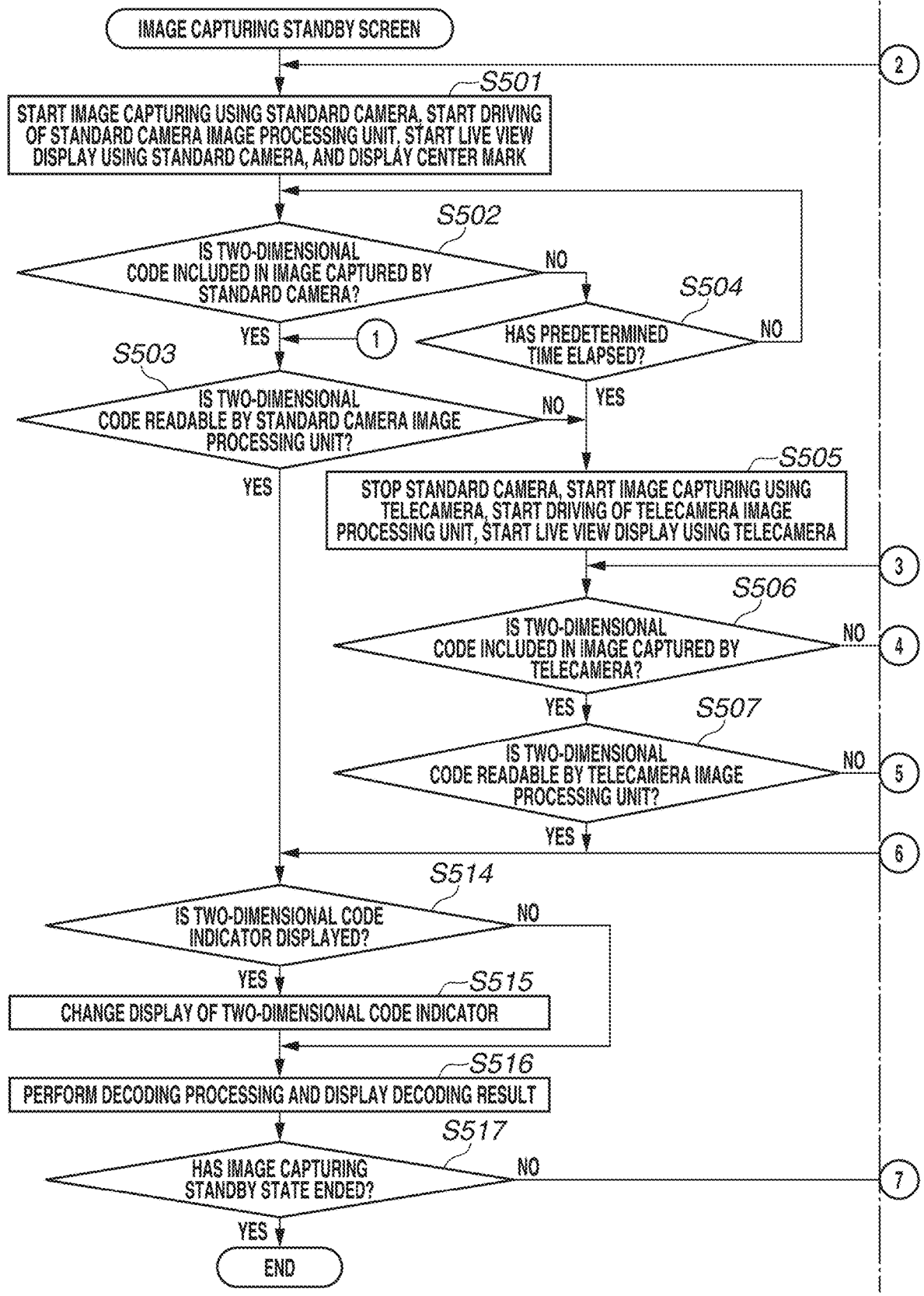
FIGS. 5A and 5B are a flowchart illustrating control processing of two-dimensional code reading according to a second exemplary embodiment.
Figure 5B:
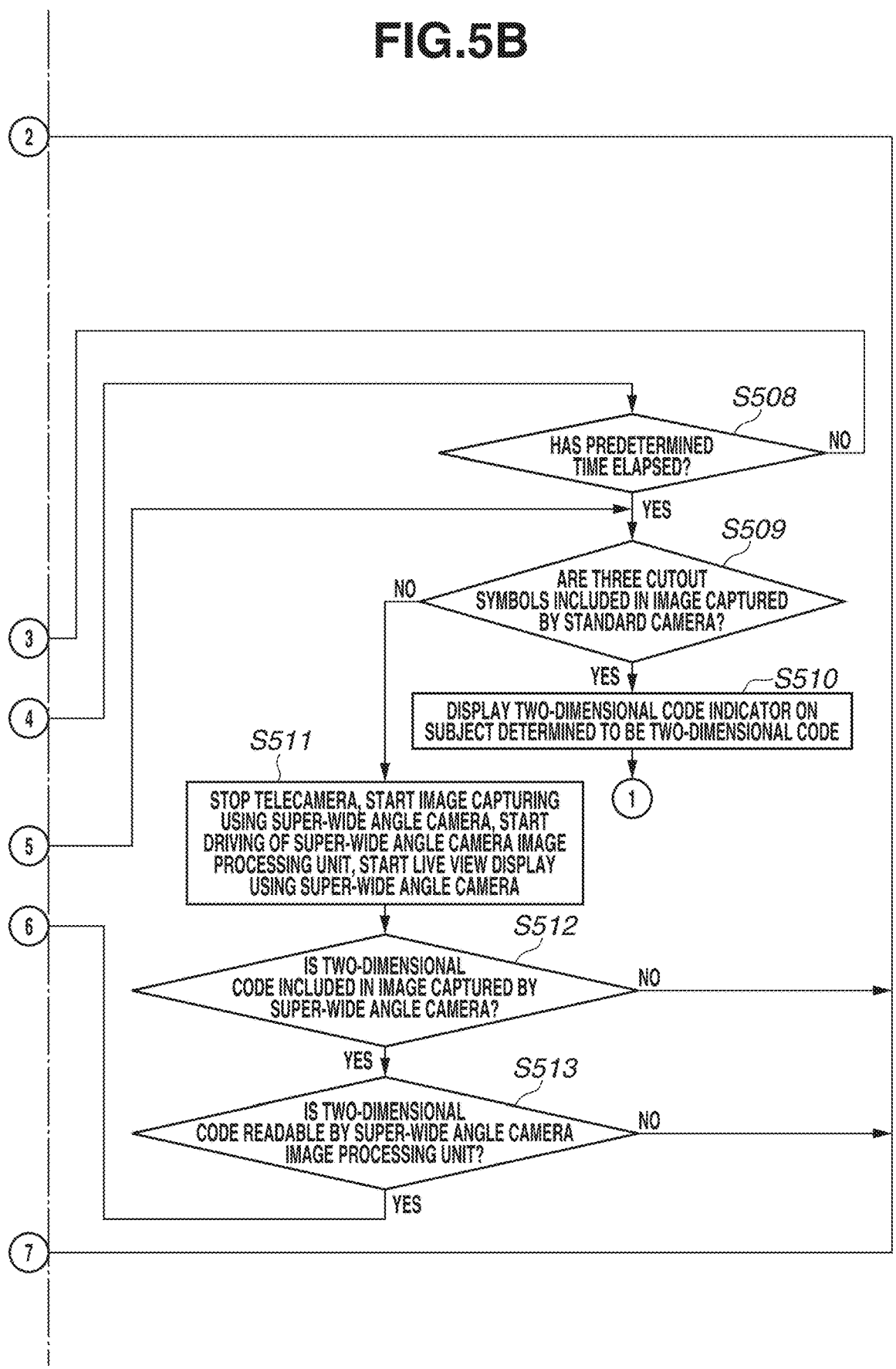

In a second exemplary embodiment, the description will be given of an example in which the three rear cameras 114 are individually driven by switching the rear cameras 114 one by one, and control is performed in such a manner that a two-dimensional code, which is optical code information, can be recognized by the most appropriate camera. FIGS. 5A and 5B are a flowchart illustrating control processing of individually driving the rear cameras 114 of the smartphone 100 one by one and reading a two-dimensional code. The control processing is implemented in the smartphone 100 by the CPU 101 executing a program stored in the nonvolatile memory 103. The flowchart illustrated in FIGS. 5A and 5B is started when a camera application is started up in the smartphone 100 and the smartphone 100 is in an image capturing standby state. An application to be started up is not limited to the above-described camera application. The flowchart may be started when a two-dimensional code reading function of a two-dimensional code readable application for recognizing a two-dimensional code is started up and the smartphone 100 is in the image capturing standby state. FIGS. 3A, 3B, 3C, and 3D each illustrate a display example displayed on the display 105 when a two-dimensional code is read.

In S501, the CPU 101 drives the standard camera 114b and the standard camera image processing unit 104b, and starts image capturing using the standard camera 114b. In S401 in the first exemplary embodiment, the CPU 101 starts the driving of the telecamera 114a, the standard camera 114b, the super-wide angle camera 114c, the telecamera image processing unit 104a, the standard camera image processing unit 104b, and the super-wide angle camera image processing unit 104c. Different from this operation, in S501, the CPU 101 drives only the standard camera 114b and the standard camera image processing unit 104b, and does not drive the telecamera 114a, the telecamera image processing unit 104a, the super-wide angle camera 114c, and the super-wide angle camera image processing unit 104c at this timing. The CPU 101 starts to display an LV image captured by the standard camera 114b, on the display 105. Similar to S402, a display example displayed at this time is illustrated in FIG. 3A. In the second exemplary embodiment, the frame 301a needs not be displayed.

In S502, similar to S403, using the standard camera image processing unit 104b, the CPU 101 determines whether an optical code image, i.e., a subject appearing to be a two-dimensional code, is included in an image captured by the standard camera 114b. If the two-dimensional code is included in the captured image (YES in S502), the processing proceeds to S503. If the two-dimensional code is not included in the captured image (NO in S502), the processing proceeds to S504.

In S503, similar to S404, the CPU 101 determines whether the two-dimensional code is readable by the standard camera image processing unit 104b from the image captured by the standard camera 114b. If the two-dimensional code is readable (YES in S503), the processing proceeds to S514. If the two-dimensional code is unreadable (NO in S503), the processing proceeds to S505.

In S504, the CPU 101 determines whether a predetermined time has elapsed since the driving of the standard camera 114b has been started in S501. If the predetermined time has elapsed (YES in S504), the processing proceeds to S505. If the predetermined time has not elapsed (NO in S504), the processing returns to S502. If it is determined in S502 that a subject appearing to be a two-dimensional code is not included in the image captured by the standard camera 114b, it is considered that the user might have just started up the camera application and have not framed a two-dimensional code into an image capturing executable range yet. For this reason, a time from when the driving of the standard camera 114b has been started is measured, and if the predetermined time has elapsed, it is assumed that a two-dimensional code is not included in the image capturing executable range of the standard camera 114b, or the two-dimensional code is too small, and the processing proceeds to S505. For example, a time about 5 seconds is assumed to be the predetermined time, but the predetermined time may be a time shorter than 5 seconds or a time longer than 5 seconds, or may be arbitrarily settable by the user. The measured time is reset upon the driving stop of the standard camera 114b or reading execution of a two-dimensional code.

In S505, the CPU 101 stops the driving of the standard camera 114b and the standard camera image processing unit 104b, and starts the driving of the telecamera 114a and the telecamera image processing unit 104a. Since a two-dimensional code has been determined in S503 to be unreadable even though a subject appearing to be a two-dimensional code has been recognized in S502 from the image captured by the standard camera 114b, it can be assumed that the two-dimensional code is not large enough to read information therefrom. Since the two-dimensional code is not large enough, the code 304 can be recognized as a two-dimensional code based on the symbols 601, but the shape formed by the cells 602 cannot be accurately recognized and information cannot be read. Thus, by switching the standard camera 114b to the telecamera 114a, the two-dimensional code is enlarged and read. Since the driving of the standard camera 114b has been stopped, an LV image captured by the telecamera 114a is displayed on the display 105. The marker 302 indicating the center of the LV image is continuously displayed in an overlaid manner on the LV image.

In S506, similar to S405, using the telecamera image processing unit 104a, the CPU 101 determines whether a subject appearing to be a two-dimensional code is included in an image captured by the telecamera 114a. If the two-dimensional code is included in the captured image (YES in S506), the processing proceeds to S507. If the two-dimensional code is not included in the captured image (NO in S506), the processing proceeds to S508.

In S507, similar to S406, the CPU 101 determines whether the two-dimensional code is readable by the telecamera image processing unit 104a from the image captured by the telecamera 114a. If the two-dimensional code is readable (YES in S507), the processing proceeds to S514. If the two-dimensional code is unreadable (NO in S507), the processing proceeds to S509.

In S508, the CPU 101 determines whether a predetermined time has elapsed since the driving of the telecamera 114a has been started in S505. If the predetermined time has elapsed (YES in S508), the processing proceeds to S509. If the predetermined time has not elapsed (NO in S508), the processing returns to S506. A time from when the driving of the telecamera 114a has been started in S505 is measured. As described above in S504, a time, for example about 5 seconds, is assumed to be the predetermined time, but the predetermined time may be a time shorter than 5 seconds or a time longer than 5 seconds, or may be arbitrarily settable by the user. The predetermined time in S508 may be set to a time different from the predetermined time set in S504. The measured time is reset upon the driving stop of the telecamera 114a or the execution of the decoding processing of a two-dimensional code.

In S509, similar to S407, the CPU 101 determines whether the three symbols 601 are included in the image captured by the telecamera 114a in S505. If the three symbols 601 are included (YES in S509), the processing proceeds to S510. If not the three symbols 601 are included (NO in S509), the processing proceeds to S511.

In S510, similar to S408, the CPU 101 displays a two-dimensional code indicator, like the frame 305 illustrated in FIG. 3A, on the subject appearing to be a two-dimensional code that has been determined in S506, and the processing returns to S503.

In S511, the CPU 101 stops the driving of the telecamera 114a and the telecamera image processing unit 104a, and starts the driving of the super-wide angle camera 114c and the super-wide angle camera image processing unit 104c. Based on S502, S503, S506, and S507, an image of the entire two-dimensional code might fail to be captured, for example as illustrated in FIG. 3C, because the distance between the two-dimensional code and the rear camera 114 is too short. In this case, because the image of the entire two-dimensional code has not been captured even with use of the standard camera 114b in S503, by switching the telecamera 114a to the super-wide angle camera 114c, an image capturing executable range is widened to capture the image of the entire two-dimensional code. Since the driving of the telecamera 114a has been stopped, an LV image capture by the super-wide angle camera 114c is displayed on the display 105. The marker 302 indicating the center of the LV image is continuously displayed in an overlaid manner on the LV image.

In S512, similar to S409, using the super-wide angle camera image processing unit 104c, the CPU 101 determines whether a subject appearing to be a two-dimensional code is included in an image captured by the super-wide angle camera 114c. If the two-dimensional code is included in the captured image (YES in S512), the processing proceeds to S513. If the two-dimensional code is not included in the captured image (NO in S512), the processing returns to S501.

In S513, similar to S410, the CPU 101 determines whether the two-dimensional code is readable by the super-wide angle camera image processing unit 104c from the image captured by the super-wide angle camera 114c. If the two-dimensional code is readable (YES in S513), the processing proceeds to S514. If the two-dimensional code is unreadable (NO in S513), the processing returns to S501.

In S514, similar to S411, the CPU 101 determines whether the two-dimensional code indicator displayed in S510 is displayed. If the two-dimensional code indicator is displayed (YES in S514), the processing proceeds to S515. If the two-dimensional code indicator is not displayed (NO in S514), the processing proceeds to S516.

In S515, similar to S412, the CPU 101 changes a display mode of the frame 305, which is the two-dimensional code indicator, that has been displayed in S510.

In S516, similar to S413, the CPU 101 decodes the two-dimensional code read in S503, S507, or S513, and displays the decoded result on the display 105.

In S517, similar to S414, the CPU 101 determines whether the image capturing standby state has ended. If the image capturing standby state has ended (YES in S517), the control flow ends. If the image capturing standby state has not ended (NO in S517), the processing returns to S501.

As described above with reference to FIGS. 3A, 3B, 3C, and 3D and the control flow illustrated in FIGS. 5A and 5B, the three rear cameras 114, including the telecamera 114a, the standard camera 114b, and the super-wide angle camera 114c, are individually driven to read a two-dimensional code. Since the three rear cameras 114 are automatically switched based on a positional relationship between the rear camera 114 and a two-dimensional code, the two-dimensional code can be read by the most appropriate camera without the user switching the rear cameras 114. There are the following two conditions as a switching condition of the rear camera 114. The first one is a case where information cannot be read from a two-dimensional code although a shape (symbol 601) appearing to be a two-dimensional code is included in an image captured by any one of the rear cameras 114. The second one is a case where a subject appearing to be a two-dimensional code is not included in an image captured by any one of the rear cameras 114 and a predetermined time has elapsed. In a case where at least one of the above-described two conditions is satisfied, if the standard camera 114b, for example, is driven among the rear cameras 114, the driving of the standard camera 114b is stopped and the driving of the telecamera 114a is started. Since an LV image is also switched along with the switching of the rear camera 114, the user can identify a camera that currently captures an image of a two-dimensional code. By the user framing a two-dimensional code to match the marker 302, even if the user does not clearly identify a driven camera among the three rear cameras 114, a two-dimensional code can be easily recognized. Since the three rear cameras 114 are individually driven, as compared with a case where all the three rear cameras 114 are driven together, power consumption can be reduced. In this way, using the three rear cameras 114, a two-dimensional code can be read with a wider range of focal length. Therefore, the user can reduce an operation of bringing a reading device of an electronic apparatus away from or close to the two-dimensional code.

By displaying, on the LV images, the marker 302 indicating the center of LV images captured by the three rear cameras 114, if the user frames the code 304 with reference to the marker 302, even when the camera is automatically switched, the code 304 is highly likely to fall within an image capturing range. If the code 304 falls within an image capturing range, recognition is more likely to be performed quickly.

In the present exemplary embodiment, the description has been given of an example in which, simultaneously or individually using the three rear cameras 114, reading of a printed or displayed two-dimensional code, which is optical code information, is facilitated, but the present exemplary embodiment is not limited to this. A target to be read is only required to be optical code information. For example, a one-dimensional code may be read instead of a two-dimensional code. A target to be read may be a pattern image created by various patterns that can hold information irrespective of the dimensional. The present exemplary embodiment can be applied not only to a two-dimensional code but also to a subject, such as a human or an animal, as a target to be recognized in the present exemplary embodiment. More specifically, in the smartphone 100 including cameras that can recognize a subject, such as a human or an animal, the three rear cameras 114 are simultaneously or individually driven and image capturing is started. Even though a subject cannot be clearly recognized by the standard camera 114b, if a moving object or an object appearing to be a subject can be recognized, the standard camera 114b is switched to the telecamera 114a, and a subject is to be recognized by the telecamera 114a. If a subject is recognizable by the telecamera 114a, the subject that has been recognized by the telecamera 114a is recognized as a subject and image capturing is performed. If a subject has been unrecognizable even though the telecamera 114a is used, the telecamera 114a is switched to the super-wide angle camera 114c, and the subject is recognized by the super-wide angle camera 114c. Even if the present exemplary embodiment is applied to a subject, such as a human or an animal, not to a two-dimensional code as described above, a similar effect can be obtained. In other words, an image of a subject can be captured in an optimum size irrespective of a positional relationship between a camera and the subject, and the subject can be easily framed.

In the above-described present exemplary embodiment, control is performed in such a manner that a two-dimensional code can be recognized without the user caring about a positional relationship between a camera and the two-dimensional code. In this way, because the most appropriate camera reads the two-dimensional code without the user caring about a positional relationship between a camera and the two-dimensional code, the user can easily cause the two-dimensional code to be read under more diversified situations. Furthermore, since an LV image is displayed on the display 105 while an image of a two-dimensional code is being captured, by capturing an image of the two-dimensional code so as to fall onto the LV image, the smartphone 100 can recognize the two-dimensional code using a desirable camera. In the first exemplary embodiment, irrespective of which camera among simultaneously-driven three cameras reads a two-dimensional code, an LV image captured by the standard camera 114b is displayed on the display 105. Thus, as compared with a case where an LV image captured by the telecamera 114a is displayed, the user can frame a two-dimensional code while viewing a wider range. In the second exemplary embodiment, because an LV image captured by a driven camera is displayed, an image of a two-dimensional code can be captured while the user recognizes a driven camera.

The above-described various types of control that have been described to be performed by the CPU 101 may be performed by one piece of hardware, or the entire apparatus may be controlled by a plurality of pieces of hardware (e.g., a plurality of processors or circuits) sharing processing.

The exemplary embodiments have been described in detail, but some embodiments are not limited to these specific exemplary embodiments, and various configurations are also included in some embodiments without departing from the spirit of the disclosure. A part of the above-described exemplary embodiments may be appropriately combined. An example in which the disclosure is applied to a smartphone has been described, but an application example is not limited to this example. The present disclosure can be applied to any electronic apparatus as long as the electronic apparatus includes imaging units and can read optical code information from a captured image. More specifically, the present disclosure can be applied to a personal computer, a tablet, a personal digital assistance (PDA), a digital camera, a portable image viewer, a printer apparatus including a display, a digital photo frame, a music player, a game machine, and an electronic book reader.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-147447, filed Aug. 9, 2019, which is hereby incorporated by reference herein in its entirety.

What is claimed is:

1. An electronic apparatus comprising:
   a first imaging unit;
   a second imaging unit with a focal length different from a focal length of the first imaging unit; and
   at least one memory and at least one processor which function as:
      a reading unit configured to read information from an optical code image included in a captured image; and
      a control unit configured to perform control so as to, in a case where information based on the optical code image has been read by the reading unit from an image captured by the first imaging unit, execute processing corresponding to the read information, and in a case where information based on the optical code image has not been read by the reading unit from an image captured by the first imaging unit, to cause the reading unit to read information based on the optical code image, from an image captured by the second imaging unit if the optical code image from an image captured by the first imaging unit satisfies a specific condition, wherein the specific condition is at least one of (1) a state where a specific shape indicating a feature of the optical code image has been recognized and information based on the optical code image has not been read by the reading unit, and (2) a state where the specific shape has not been recognized and a predetermined time has elapsed.

2. The electronic apparatus according to claim 1, wherein the control unit performs control so that image capturing is simultaneously performed by at least the first imaging unit and the second imaging unit.

3. The electronic apparatus according to claim 2, wherein the control unit performs control so as to display, on a display unit, a live view image captured by the first imaging unit, without displaying, on the display unit, a live view image captured by the second imaging unit, in a state where image capturing is simultaneously performed by the first imaging unit and the second imaging unit.

4. The electronic apparatus according to claim 1,
wherein a focal length of the first imaging unit is shorter than a focal length of the second imaging unit, and
wherein the control unit displays a first indicator indicating an image capturing executable range of the second imaging unit, on a live view image captured by the first imaging unit.

5. The electronic apparatus according to claim 1, wherein the control unit performs control, in a state where image capturing is being performed by one of the first imaging unit and the second imaging unit, to start image capturing using another imaging unit in place of the one of the first imaging unit and the second imaging unit performing image capturing, in response to the optical code image satisfying the specific condition.

6. The electronic apparatus according to claim 1, wherein the control unit performs control so as to switch image capturing from image capturing performed by the first imaging unit to image capturing performed by the second imaging unit, without a user performing a switching operation.

7. The electronic apparatus according to claim 1, wherein the control unit performs control so as to display a second indicator indicating a center of an image to be captured by the second imaging unit, on a live view image captured by the first imaging unit.

8. The electronic apparatus according to claim 1, further comprising a third imaging unit, wherein the control unit performs control, in a case where information based on the optical code image has not been read by the reading unit from an image captured by the first imaging unit and an image captured by the second imaging unit, so as to cause the reading unit to read information based on the optical code image, from an image captured by the third imaging unit, and execute processing corresponding to the read information.

9. The electronic apparatus according to claim 8, wherein a focal length of the third imaging unit is shorter than a focal length of the first imaging unit.

10. The electronic apparatus according to claim 1, wherein the processing corresponding to the read information is processing of displaying the information.

11. The electronic apparatus according to claim 1, wherein the processing corresponding to the read information is, in a case where the read information is access information regarding a specific access destination, processing of accessing the specific access destination.

12. The electronic apparatus according to claim 1, wherein the control unit displays a message for prompting a user to move an optical code image into a first indicator indicating an image capturing executable range of the second imaging unit.

13. The electronic apparatus according to claim 1, wherein the control unit performs control so as to display a third indicator on the optical code image read by the reading unit.

14. The electronic apparatus according to claim 1, wherein the optical code image is a printed or displayed pattern image.

15. The electronic apparatus according to claim 14, wherein the optical code image is a barcode or a quick response (QR) code.

16. A control method of an electronic apparatus including a first imaging unit, a second imaging unit with a focal length different from a focal length of the first imaging unit, at least one memory, and at least one processor, the control method comprising:
    reading information from an optical code image included in a captured image; and
    performing control so as to, in a case where information based on the optical code image has been read in the reading from an image captured by the first imaging unit, execute processing corresponding to the read information, and in a case where information based on the optical code image has not been read in the reading from an image captured by the first imaging unit, read information based on the optical code image, in the reading from an image captured by the second imaging unit if the optical code image from an image captured by the first imaging unit satisfies a specific condition,
    wherein the specific condition is at least one of (1) a state where a specific shape indicating a feature of the optical code image has been recognized and information based on the optical code image has not been read by the reading unit, and (2) a state where the specific shape has not been recognized and a predetermined time has elapsed.

17. A non-transitory computer-readable storage medium storing a program for causing a computer that includes a first imaging unit and a second imaging unit with a focal length different from a focal length of the first imaging unit to function as an electronic apparatus comprising:
    a reading unit configured to read information from an optical code image included in a captured image; and
    a control unit configured to perform control so as to, in a case where information based on the optical code image has been read by the reading unit from an image captured by the first imaging unit, execute processing corresponding to the read information, and in a case where information based on the optical code image has not been read by the reading unit from an image captured by the first imaging unit, to cause the reading unit to read information based on the optical code image, from an image captured by the second imaging unit if the optical code image from an image captured by the first imaging unit satisfies a specific condition,
    wherein the specific condition is at least one of (1) a state where a specific shape indicating a feature of the optical code image has been recognized and information based on the optical code image has not been read by the reading unit, and (2) a state where the specific shape has not been recognized and a predetermined time has elapsed.

* * * * *